United States Patent
Irwin et al.

(10) Patent No.: US 9,885,434 B2
(45) Date of Patent: Feb. 6, 2018

(54) BULKHEAD FITTING ASSEMBLY AND METHOD OF MAKING

(71) Applicant: The Boeing Company, Chicago, IL (US)

(72) Inventors: James P. Irwin, Renton, WA (US); David W. Minteer, Lake Tapps, WA (US); Benjamin A. Johnson, Lynnwood, WA (US); Erik W. Dowell, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/733,158

(22) Filed: Jun. 8, 2015

(65) Prior Publication Data

US 2015/0267846 A1   Sep. 24, 2015

Related U.S. Application Data

(62) Division of application No. 13/166,371, filed on Jun. 22, 2011, now Pat. No. 9,080,694.

(51) Int. Cl.
*F16L 19/00* (2006.01)
*F16L 19/028* (2006.01)
(Continued)

(52) U.S. Cl.
CPC ........... *F16L 19/0286* (2013.01); *B64C 1/10* (2013.01); *F16L 5/06* (2013.01); *F16L 5/08* (2013.01); *F16L 5/12* (2013.01); *F16L 19/02* (2013.01); *F16L 23/028* (2013.01); *F16L 23/036* (2013.01); *F16L 23/12* (2013.01);
(Continued)

(58) Field of Classification Search
CPC ........... F02M 25/0721; F02M 25/0703; F02M 25/0714; F16L 25/02; F16L 25/026
See application file for complete search history.

(56) References Cited

U.S. PATENT DOCUMENTS

| 333,413 A | 12/1885 | Hoeveler |
| 1,505,279 A | 8/1924 | Mueller et al. |

(Continued)

FOREIGN PATENT DOCUMENTS

| BE | 637028 | 12/1963 |
| CN | 201141488 | 10/2008 |

(Continued)

OTHER PUBLICATIONS

CA, Office Action, Canadian Application No. 2,834,070, dated Oct. 19, 2015.

(Continued)

*Primary Examiner* — Erin B Saad
(74) *Attorney, Agent, or Firm* — Thompson Hine LLP

(57) ABSTRACT

A method of making a bulkhead fitting assembly may include joining a tube to a thermal shell of a mounting flange, the mounting flange shaped to be attached to a bulkhead and including an adapter; forming the thermal shell to have a portion spaced away from the tube to form an air pocket between the tube and the thermal shell adjacent the mounting flange; and placing a bushing on the adapter such that the bushing completes a current path from the tube to the adapter, from the adapter to the bushing, and from the bushing to the bulkhead.

14 Claims, 9 Drawing Sheets

(51) Int. Cl.

| | | |
|---|---|---|
| *F16L 5/06* | (2006.01) | |
| *F16L 5/08* | (2006.01) | |
| *B64C 1/10* | (2006.01) | |
| *F16L 5/12* | (2006.01) | |
| *F16L 19/02* | (2006.01) | |
| *F16L 23/028* | (2006.01) | |
| *F16L 23/12* | (2006.01) | |
| *F16L 23/22* | (2006.01) | |
| *F16L 25/02* | (2006.01) | |
| *F16L 23/036* | (2006.01) | |
| *F16L 23/18* | (2006.01) | |
| *F16L 57/04* | (2006.01) | |

(52) U.S. Cl.
CPC ............... *F16L 23/18* (2013.01); *F16L 23/22* (2013.01); *F16L 25/026* (2013.01); *F16L 57/04* (2013.01); *F16L 2201/40* (2013.01); *Y10T 29/49826* (2015.01); *Y10T 29/49948* (2015.01)

(56) References Cited

U.S. PATENT DOCUMENTS

| | | | |
|---|---|---|---|
| 2,382,970 A | | 8/1945 | Borcherdt |
| 2,424,208 A | * | 7/1947 | Poupitch ................. F16B 39/24 411/134 |
| 2,427,431 A | * | 9/1947 | Wieland .................. E03D 11/16 106/263 |
| 3,227,475 A | | 1/1966 | Sinkinson |
| 3,576,330 A | * | 4/1971 | Gard ....................... F16J 15/125 277/654 |
| 5,201,549 A | | 4/1993 | Davey |
| 5,433,183 A | * | 7/1995 | Vansnick .............. F16L 37/008 123/568.11 |
| 5,568,947 A | | 10/1996 | Paquette |
| 5,970,960 A | | 10/1999 | Azuma |
| 6,145,888 A | * | 11/2000 | Ohmi .................. F16L 19/0218 277/314 |
| 6,173,701 B1 | | 1/2001 | Azuma |
| 6,209,153 B1 | * | 4/2001 | Segien, Jr. ............. E03C 1/0401 137/359 |
| 6,293,265 B1 | * | 9/2001 | Gagnon .............. F02M 25/0703 123/568.17 |
| 6,719,294 B2 | * | 4/2004 | Nguyen ................. F16L 21/025 277/314 |
| 6,726,161 B2 | | 4/2004 | Plump et al. |
| 7,857,567 B2 | | 12/2010 | Iwata et al. |
| 2008/0116319 A1 | | 5/2008 | Negley et al. |
| 2008/0308476 A1 | * | 12/2008 | Silverstein ............ E03F 5/0407 210/163 |
| 2010/0123307 A1 | * | 5/2010 | Coronado ............... E03D 11/16 285/56 |
| 2010/0199650 A1 | * | 8/2010 | Hassdenteufel ... F02M 25/0721 60/320 |

FOREIGN PATENT DOCUMENTS

| | | |
|---|---|---|
| FR | 2706976 | 12/1994 |
| WO | 98/15765 | 4/1998 |

OTHER PUBLICATIONS

PCT, International Search Report and Written Opinion, International Application No. PCT/US2012/038836 (dated Aug. 31, 2012).
U.S., Non-Final Office Action; U.S. Appl. No. 13/166,371 (dated May 23, 2013).
U.S., Final Office Action; U.S. Appl. No. 13/166,371 (dated Dec. 15, 2014).
U.S., Notice of Allowance; U.S. Appl. No. 13/166,371 (dated Mar. 11, 2015).
Irwin, James P.; "Title"; filed (Jun. 11, 2015).
EP, Examination Report, European Patent Application No. 12725961.2 (dated Feb. 19, 2016).
CA, Office Action; Canadian Patent Application No. 2,834,070; 3 pages (dated Feb. 21, 2017).
U.S., Non-Final Office Action; U.S. Appl. No. 14/733,187; 10 pages (dated Sep. 12, 2017).
CN, English translation of Office Action and Search Report; Chinese Patent Application No. 2015109192694; 6 pages (dated Apr. 27, 2017).

* cited by examiner

BULKHEAD FITTING ASSEMBLY AND METHOD OF MAKING

TECHNICAL FIELD

The disclosure relates to bulkhead fittings and methods of making bulkhead fittings, and more specifically, bulkhead fittings for use in a composite structure aircraft and methods of making such bulkhead fittings.

BACKGROUND

Bulkhead fittings are used as part of a conduit system to pass a conduit, tube, or other similar apparatus through a fluid-impermeable barrier or bulkhead and maintain the integrity of the barrier. These barriers or bulkheads may be employed to form fuel tanks, climate-controlled spaces, air containment units, and other enclosures intended to segregate either a liquid or a gas from a surrounding environment. These bulkhead fittings are furnished with redundant seals to prevent external fluid transfer or leakage through the bulkhead around the tube by means of O-rings, fay, and fillet seals.

A bulkhead fitting traditionally functions by providing a robust and reliable connection to structure allowing fluid to be transmitted across the interface through a transport element tube. In hydraulic systems, the hydraulic fluid (and therefore hydraulic transfer element tube) may become heated to high temperatures. Such high temperatures may damage bulkhead, barrier, or other surrounding structure if there is a direct connection between the transfer element tube and the heat-sensitive structure. Heat may also deform or modify the interface between the bulkhead and conduit and compromise the sealing features of the fitting. Therefore, bulkhead fittings have been developed that thermally insulate the fitting and connected conduit from a bulkhead on which the fitting is mounted to prevent thermal damage to the bulkhead.

One example of such thermal insulation is the use of a plastic insulator between the fitting and bulkhead. This barrier may be up to an inch thick on either side of the fitting in order to provide sufficient insulation to prevent damage to the bulkhead. Another example is to provide a fitting with a wide, thermally conductive surface to dissipate heat without creating a localized area of high temperature.

With the use of composite materials for aircraft, it may be necessary to utilize hydraulic conduits to transfer electrical energy from lightning strikes, precipitation static, and other electromagnetic events (EME). Because thermal insulating materials also tend to be electrically insulating, such structures may not allow a combined solution of thermal non-conductivity (to resist the flow of heat) and electrical conductivity (to pass the flow of electrical current from fitting to bulkhead) in the properties of the insulating materials in a hydraulic bulkhead fitting. To provide for electrical conductivity while providing thermal insulation, electric current may be diverted away from the hydraulic line.

Further, Federal Aviation Regulation (FAR) 25.981 requires a redundant system so that any single failure combined with a latent failure cannot result in an ignition source within the fuel tank of an aircraft. There is therefore recognized a need in the art for an improved bulkhead fitting assembly that satisfies FAR 25.981.

One method of overcoming this restriction has been the use of additional components included with a bulkhead fitting installation. However, installing these additional parts can add time and weight to a bulkhead fitting installation to provide for protection against spark propagation. There is therefore a need for a bulkhead fitting assembly that addresses the aforementioned shortcomings and others that may exist in prior art devices.

SUMMARY

In one embodiment, the disclosed method of making a bulkhead fitting assembly may include joining a tube to a thermal shell of a mounting flange, the mounting flange shaped to be attached to a bulkhead and including an adapter; forming the thermal shell to have a portion spaced away from the tube to form an air pocket between the tube and the thermal shell adjacent the mounting flange; and placing a bushing on the adapter such that the bushing completes a current path from the tube to the adapter, from the adapter to the bushing, and from the bushing to the bulkhead.

In another embodiment, the disclosed method of making a bulkhead fitting assembly may include joining a tube to a thermal shell of a mounting flange, the mounting flange having a plurality of mounting studs shaped to be inserted through openings in a bulkhead, the mounting flange shaped to be attached to the bulkhead; forming the thermal shell to have a portion spaced away from the tube to form an air pocket between the tube and the thermal shell adjacent the mounting flange; and placing bushings on the mounting studs such that the bushings complete a current path from the tube to the adapter, from the adapter to the bushings, and from the bushings to the bulkhead.

In yet another embodiment, the disclosed method of making a bulkhead fitting assembly may include joining a tube to a thermal shell of a mounting flange, the mounting flange shaped to be attached to a bulkhead; forming the thermal shell to have a portion spaced away from the tube to form an air pocket between the tube and the thermal shell adjacent the mounting flange; attaching an adapter to the mounting flange so that the adapter extends away from the mounting flange and from the thermal shell; and placing a jam nut on the adapter so that the bulkhead fitting assembly is locked in place by sandwiching the bulkhead between the mounting flange and the jam nut.

Other objects and advantages of the disclosed bulkhead fitting assembly and method of making will be apparent from the following description, the accompanying drawings, and the appended claims.

DETAILED DESCRIPTION

Figure 1:
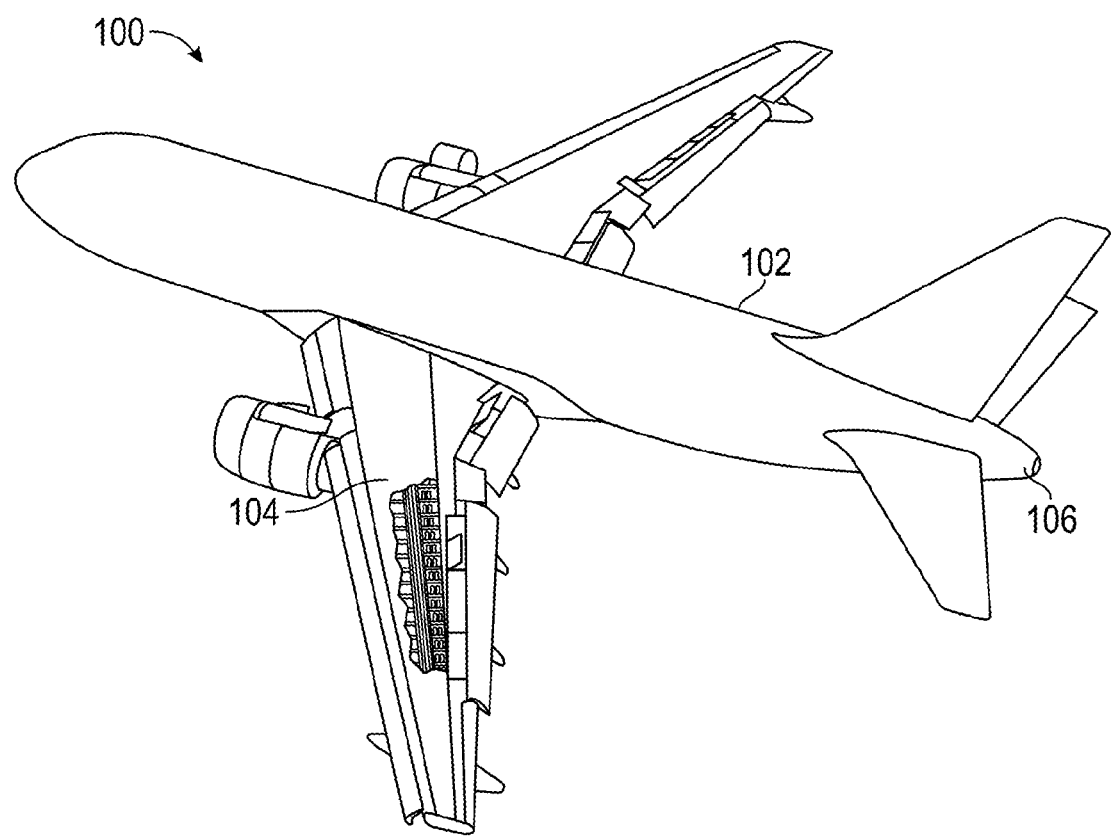
FIG. 1 is a perspective view of an aircraft, partially broken away to show bulkheads having the disclosed bulkhead fitting assembly.
Figure 2:
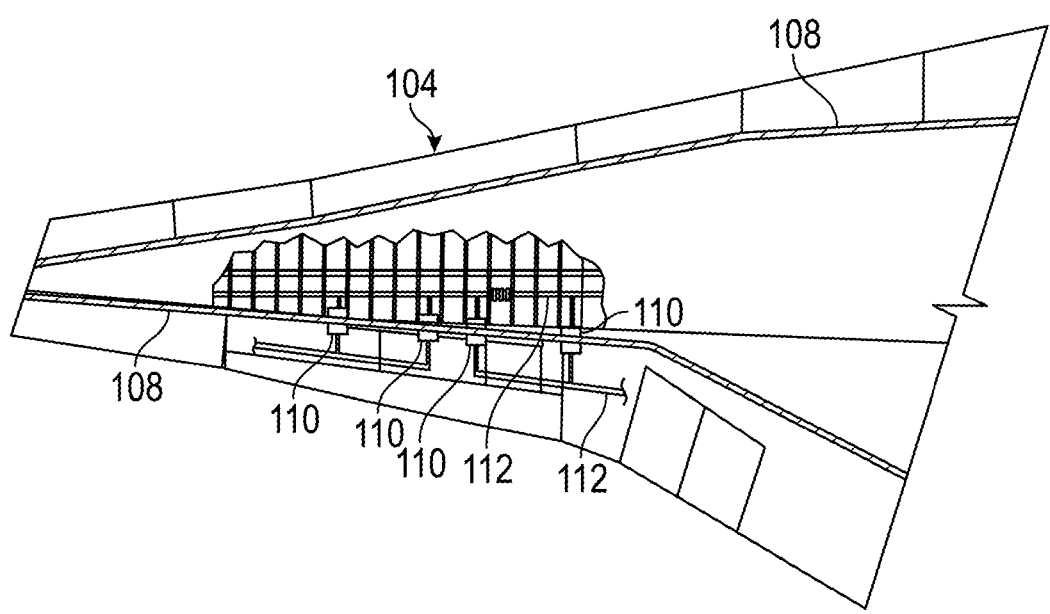
FIG. 2 is detail top plan view of a wing of the aircraft of FIG. 1, broken away to show the disclosed bulkhead fitting assembly.

FIG. 1 shows an aircraft 100 according to one embodiment of the disclosed bulkhead fitting assembly. The aircraft 100 may include a fuselage 102, wings 104, and a tail 106. The wings 104 may include tanks to store fuel for the aircraft 100. As shown in FIG. 2, inside the wings 104 the tanks may have bulkheads 108 to isolate the fuel from the rest of the aircraft 100. As further shown in FIG. 2, a number of hydraulic conduits 112 may pass through the bulkhead 108 with each hydraulic conduit 112 including a bulkhead fitting assembly 110.

While the bulkhead fitting assembly 110 is generally described as utilized in concert with an aircraft 100, and in particular an aircraft made of carbon fiber reinforced polymer (CFRP), it is understood that the bulkhead fitting assembly 110 may be used in other non-aircraft vehicles, including industrial vehicles (e.g., lift trucks), spacecraft, construction vehicles (e.g., earthmoving equipment), amphibious vehicles (e.g., hovercraft), and marine vessels, such as surface ships, boats, and submarines. Further, the bulkhead fitting assembly 110 may be used in non-hydraulic applications, including electrical conduits, water conduits, and pneumatic conduits. Further, the disclosed bulkhead fitting assembly may be used with other conduits, tubes, and apparatus that passes through a bulkhead 108 or other barrier.

Figure 3A:
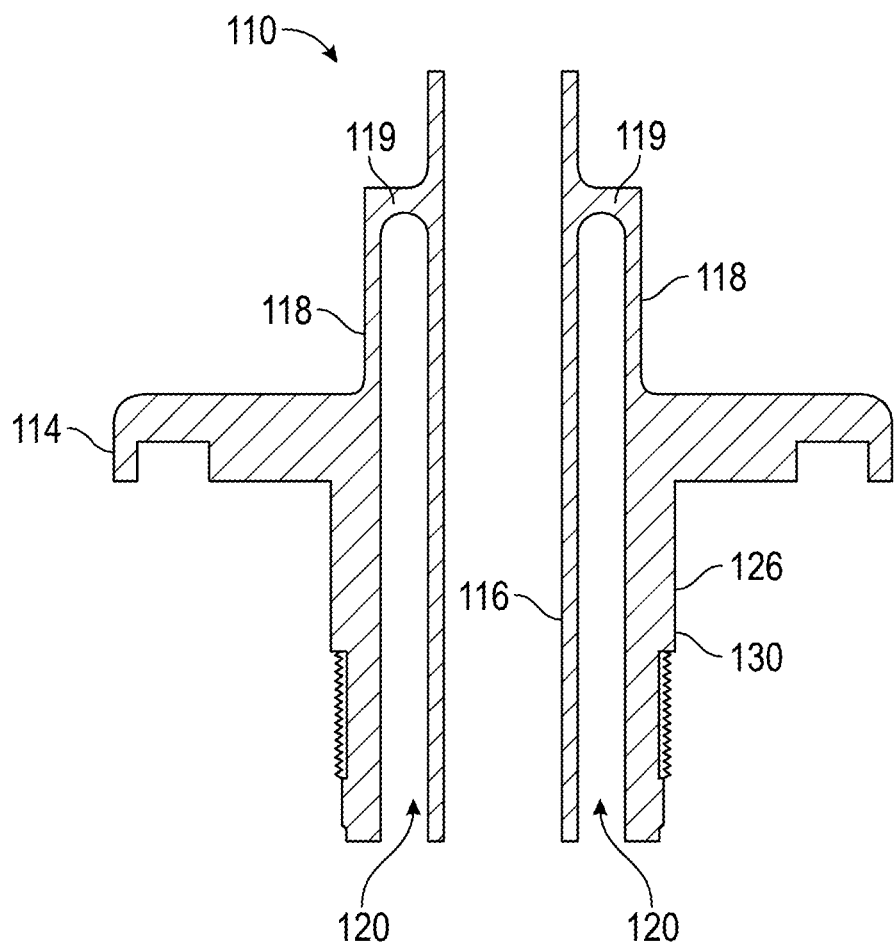
FIG. 3A is a side elevation in section of an embodiment of the disclosed bulkhead fitting assembly.
Figure 3B:
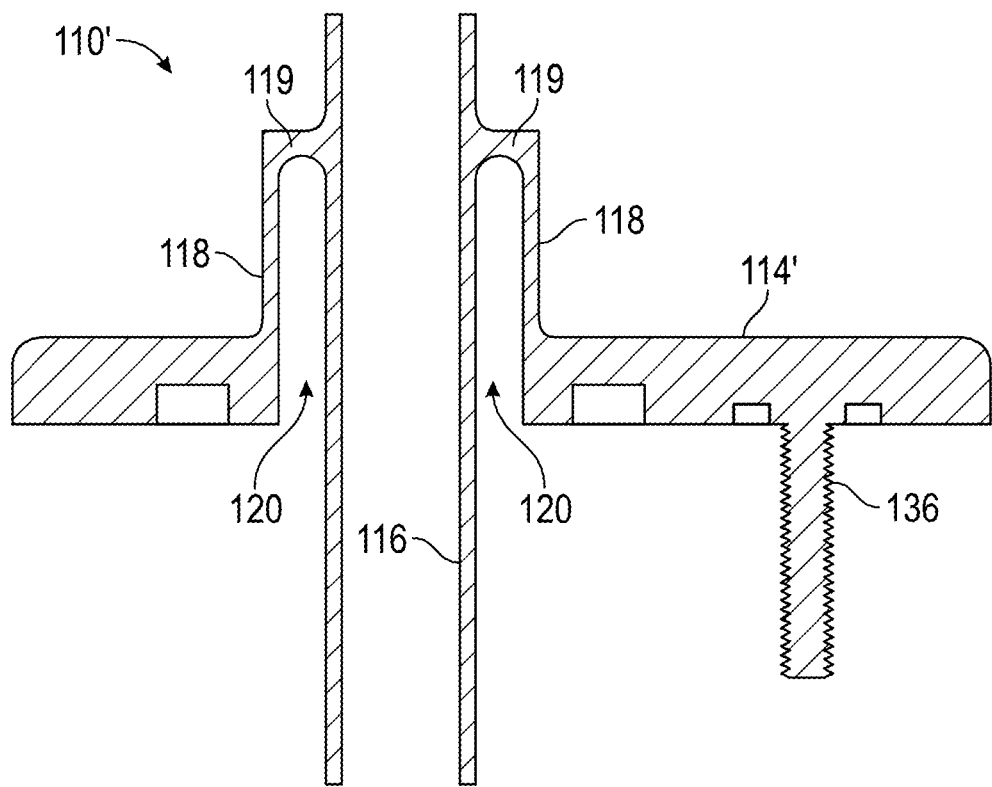
FIG. 3B is a side elevation in section of another embodiment of the disclosed bulkhead fitting assembly.

FIGS. 3A and 3B illustrate embodiments of the disclosed bulkhead fitting assembly 110, 110'. As shown in FIG. 3A, the bulkhead fitting assembly 110 may include a mounting flange 114 shaped to be attached to the bulkhead 108 (see FIG. 4A) and a tube 116 that may form part of the conduit 112 (see FIG. 2). The tube 116 may be joined to the mounting flange 114 by a thermal shell 118 that limits heat transfer between the tube and mounting flange. The mounting flange 114 may having a central opening for receiving the tube 116 therethrough, may extend radially away from the tube 116, and may include a cylindrical shell extending axially away from the central opening.

As is well known in the art, the amount of heat that can be transferred through a thermal path is dependent in part on the cross sectional area of the thermal path, length, and thermal conductivity of the material in the path. The thermal path in the bulkhead fitting assembly 110 through which heat transfer is limited is the thermal shell 118. By reducing the cross sectional area of the thermal shell 118 and the thermal conductivity of the material comprising the thermal shell, the amount and rate of heat transferred to the bulkhead 108 may be reduced. By adjusting the length of the thermal shell 118, the heat transferred through the shell 118 may be controlled to protect the bulkhead 108. Heat transferred through the thermal shell 118 to the mounting flange 114 and bulkhead 108 may be dissipated from the bulkhead 108 to the surrounding environment, further reducing the risk of exposing the bulkhead 108 to high temperatures.

In an embodiment, the cross sectional area of the thermal shell 118 may be reduced to minimize heat transfer through the thermal shell. The thermal shell 118 may be thin and preferably may be constructed from a material having relatively high mechanical strength to enable adequate transfer of mechanical load from the tube 116 to the mounting flange and bulkhead 108. To enable a continuous, all-metal design, allowing for electrical conductivity, the material preferably may be selected to be welded or brazed so that the shell 118 may be constructed of separate pieces and manufactured. To conduct electrical current from tube 116 to the mounting flange 114 and bulkhead 108, a material with relatively high electrical conductivity may be selected. To resist heat transfer, a material with relatively low thermal conductivity may be selected. One type material that meets these requirements is a titanium alloy. When made from this material, a bulkhead fitting 110 may be a single-piece welded part. Other materials that may be considered include corrosion-resistant steel alloys.

As further shown in FIG. 3A, the thermal shell 118 may be spaced away from the tube 116 to form an air pocket 120 between the tube 116 and thermal shell 118. This air pocket 120 may promote heat transfer away from the thermal shell 118, thereby reducing the chance of the mounting flange 114 reaching a sufficient temperature to damage the bulkhead 108. This air pocket 120 may be open to the space outside the tank and sealed from the inside of the tank to provide a fluid barrier. The air pocket 120 may be positioned inside the tank (thereby inverting the fitting), but preferably may be outside the tank so that it does not fill up with fluid.

A shoulder 119 connects the tube 116 to the shell 118. The shoulder 119 is shaped to transfer the mechanical load from the tube 116 to the shell 118 without mechanical failure of tube 116 and shell 118 (for example, cracking of a weld or breaking the shell 118) and to resist deflection of the tube 116. The shoulder 119 also prevents the tube 116 from bottoming out across the air pocket 120 if the tube 116 is shifted or displaced during normal operation. The tube 116 adjoining the shoulder 119, the shoulder 119, and the shell 118 are sized to transfer the mechanical load from the tube through the shoulder 119 and shell 118 to the flange 114 without mechanical failure of the tube 116, flange 114, or shoulder 119 and to resist deflection of the tube 116, thereby preventing the tube 116 from bottoming out across the air pocket 120.

Figure 4A:
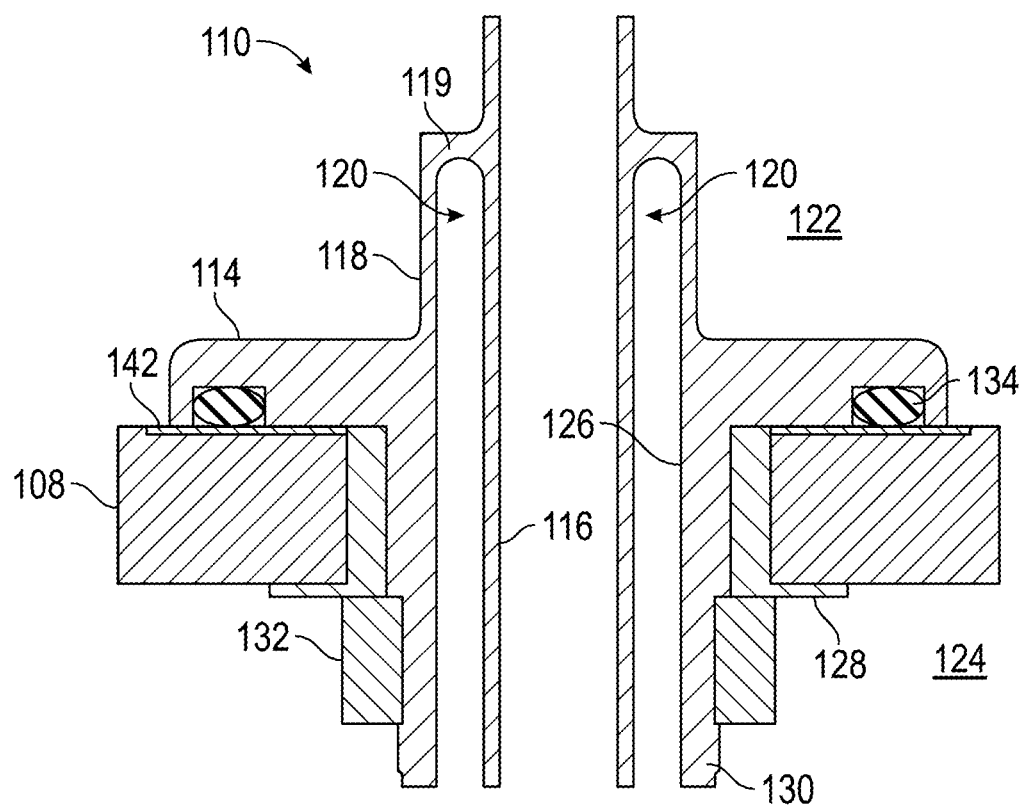
FIG. 4A is a side elevation in section the bulkhead fitting assembly of FIG. 3A.

FIG. 3A shows a bulkhead fitting assembly 110 that includes an adapter 126 extending away from the mounting flange 114 and away from the thermal shell 118. This adapter 126 may be useful in attaching the bulkhead fitting assembly 110 to the bulkhead 108 with a jamb nut 132 that may be threaded onto threads of a threaded portion 130, as shown in FIG. 4A. The adapter 126 may support a mounting provision (jam nut 132 in this figure) extending through the bulkhead 108. A bushing 128 may be inserted between the adapter 126 and bulkhead 108. As shown, the adapter 126 may include a part that extends beyond the bulkhead 108 that includes the threaded portion 130. This threaded portion 130 may receive the jamb nut 132 to lock the fitting 110 in place on the bulkhead 108.

FIG. 3B shows an alternative embodiment of the bulkhead fitting assembly 110'. With this embodiment, the adapter 126 (FIG. 4A) may be omitted and mounting studs 136 are provided on flange 114' as an alternative method of attaching the fitting 110' to the bulkhead 108, as shown and described below with reference to FIG. 4B.

Figure 4B:
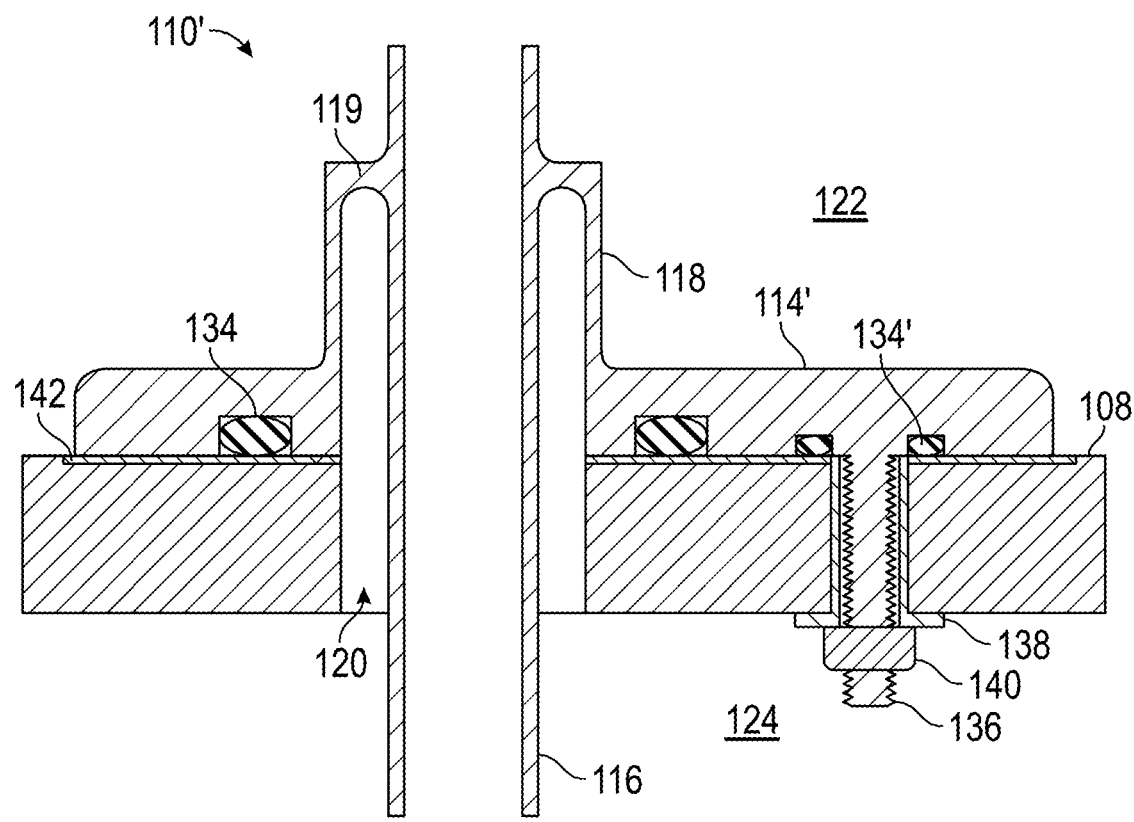
FIG. 4B is a side elevation in section of the bulkhead fitting assembly of FIG. 3B.

FIGS. 4A and 4B show alternative methods of mounting the bulkhead fitting assemblies 110, 110' to the bulkhead 108. The bulkhead 108 may separate a wet side 122 (for example, the inside of a fuel tank) from a dry side 124 (for example an air pocket or outside of a fuel tank) of an enclosure. The mounting flanges 114, 114' may be on the wet side 122 of the bulkhead 108 and the tube 116 may extend through an opening in the bulkhead 108. However, those skilled in the art will appreciate that the bulkhead fitting assemblies 110, 110' may be reversed without departing from the scope of the disclosure.

The bulkhead fitting assembly 110 illustrated in FIG. 4A may include an O-ring 134 that provides additional sealing between the mounting flange 114 and the bulkhead 108. This O-ring 134 functions in a manner that is well known in the art to seal against the fluid passing through any gaps between the mounting flange 114 and bulkhead 108.

The bulkhead fitting assembly 110 may be employed in a method of sealing an opening in a bulkhead 108. This method may include the steps of inserting a bushing 128 through an opening in the bulkhead, and inserting a remainder of the fitting assembly through the opening. The bulkhead fitting assembly 110 may include a tube 116 for carrying, for example, hydraulic fluid, a mounting flange 114, and an adapter 126 for securing the fitting assembly to the bulkhead 108. A jamb nut 132 may be attached to the adapter 126, thereby sandwiching the bulkhead 108 between the mounting flange 114 of the fitting 110 and the nut 132. The tube 116 may be connected to the mounting flange 114 by a thin thermal shell 118.

The bulkhead fitting assembly 110 may be held in place on the bulkhead 108 by sandwiching the bulkhead 108 between the mounting flange 114 of the fitting 110 and the jamb nut 132. The pressure provided by this joint deforms the O-ring 134, thereby compressing it into place and preventing fluid from leaking past the bulkhead 108. After assembly, a fillet seal (not shown) may be applied peripherally around the mounting flange 114 to prevent fuel from leaking through the opening in the bulkhead 108 through which the bulkhead fitting assembly 110 passes.

An alternative assembly method is illustrated in FIG. 4B. As shown in this figure, the fitting 110' may include a number of mounting studs 136 that extend away from the mounting flange 114' opposite the thermal shell 118. These mounting studs 136 may include a threaded segment along their lengths, or may include a threaded segment at least on the portions that extend beyond the bulkhead 108. These threaded segments may receive nuts 140 that may lock the fitting in place on the bulkhead 108. The plurality of mounting studs 136 and nuts 140 of the bulkhead fitting assembly 110' may sandwich the bulkhead fitting assembly to the bulkhead 108.

The bulkhead fitting assembly 110' may include bushings 138 inserted between the mounting studs 136 and bulkhead 108. These bushings may protect the openings in the bulkhead from the mounting studs 136 during installation and repair. The bulkhead fitting assembly 110' may include an O-ring 134 about the perimeter of the mounting flange 114' in a single piece and/or include O-rings 134' about the perimeter of the openings in the bulkhead 108 for the tube 116 and each mounting stud 136 in separate individual pieces. After assembly, a fillet seal (not shown) may be applied peripherally around the mounting flange 114' to prevent fuel from leaking through the openings in the bulkhead 108.

The improved bulkhead fitting assemblies 110, 110' illustrated in these figures accomplish the objectives of providing a bulkhead seal with a single-piece welded metal part that may be substantially impermeable to fluid transfer from the wet side 122 to the dry side 124 of the bulkhead 108. Further, the bulkhead fitting assemblies 110, 110' may reduce heat transfer from the tube 116 to the mounting flanges 114, 114', thereby reducing the potential for heat damage to the bulkhead 108. The reduction in heat transfer may be achieved by a thin metal shell 118 that may be strong enough to transfer the mechanical load from the tube to the mounting flanges 114, 114', respectively, without structural failure. The bulkhead fitting assemblies 110, 110' may provide a peripherally continuous metal path for conducting electric current from the tube 116 directly to the bulkhead 108, thereby shielding the interior of a tank from electrical discharge occurring in the environment outside of the tank and eliminating the need for additional structure to conduct electric current to the bulkhead 108.

When secured to the bulkhead 108, the bushings 128, 138 may provide an all-metal interface, creating an electrical connection through the bulkhead fitting assemblies 110, 110' between the bulkhead 108 and tube 116. The all-metal interface of the bulkhead fitting assemblies 110, 110' may assist in providing lightning strike protection by creating a current path from tube 116 to the adapter 126 and stud 136, respectively, from the adapter and stud to the bushings 128, 138, respectively, and from the bushings to the bulkhead 108. The bulkhead fitting assemblies 110, 110' resist sparking during the transfer of current. As either the jamb nut 132 or nuts 140 are in engagement with both the bulkhead fitting assemblies 110, 110', and bushings 128, 138 (respectively, as shown in FIGS. 4A and 4B), an all-metal spark resistant bond path to the fitting bulkhead fitting assemblies 110, 110' through the jam nut 132, or nuts 140, respectively, is provided.

An additional element that may be included is a thin-walled dielectric layer 142 that may further isolate the bulkhead 108 from the mounting flanges 114, 114' of the bulkhead fitting assemblies 110, 110', respectively. This thin-walled dielectric layer 142 may provide electrical insulating advantages to prevent possible sparking from the flanges 114, 114' to the bulkhead 108 inside a tank, for example. The dielectric layer 142 may encompass the full mounting surface and extend a specified distance outside the perimeter of the mounting surface. The thin-walled dielectric layer 142 may be either integrated into the bulkhead or integrated into the bulkhead fitting assemblies 110, 110'.

A fillet seal (not shown) may be provided around the perimeter of the mounting flanges 114, 114' during assembly to provide a mechanical barrier against leakage of fluid through the impermeable bulkhead barrier. Sealant (not shown) also may be applied around each nut 132, 140 and each bushing 128, 138. The fillet seal also may provide a barrier against sparks that may develop in the interface between the bulkhead fitting assemblies 110, 110' and bushings 128, 138, and bulkhead 108.

The combination of all-metal connection from tube to bushing, O-ring seal, and fillet seal provided in the installation of the bulkhead fitting may ensure that the bulkhead fitting assemblies 110, 110' complies with FAR 25.981 by providing at least three independent features for the prevention of spark propagation within, for example, a fuel tank.

Figure 5A:
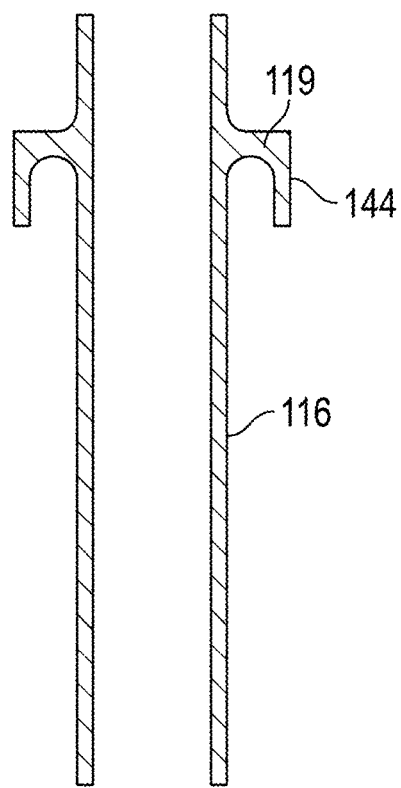
FIG. 5A is a side elevation in section of a component of the bulkhead fitting of FIG. 3A.

A novel method of constructing the hydraulic bulkhead fitting 110 is disclosed for a continuous metal part. As shown in FIG. 5A, a tube 116 may be provided having a perimeter shoulder 144 extending radially outward from the tube 116. This perimeter shoulder 144 may form the first part of the thermal shell 118 (FIG. 3A).

Figure 5B:
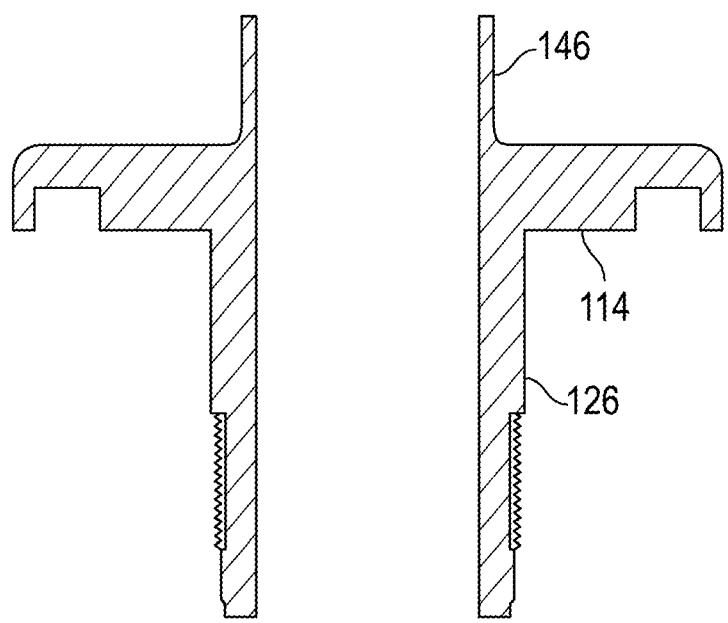
FIG. 5B is a side cutaway view of another component of the bulkhead fitting of FIG. 3A.

As shown in FIG. 5B, a mounting flange 114 may be provided having an axially extending cylindrical shell 146. This cylindrical shell 146 may be thin and may form the second part of the thermal shell 118 (FIG. 3A). The adapter 126 may be shaped to be attached to and extend away from the mounting flange 114 and from the cylindrical shell 146.

Figure 5C:
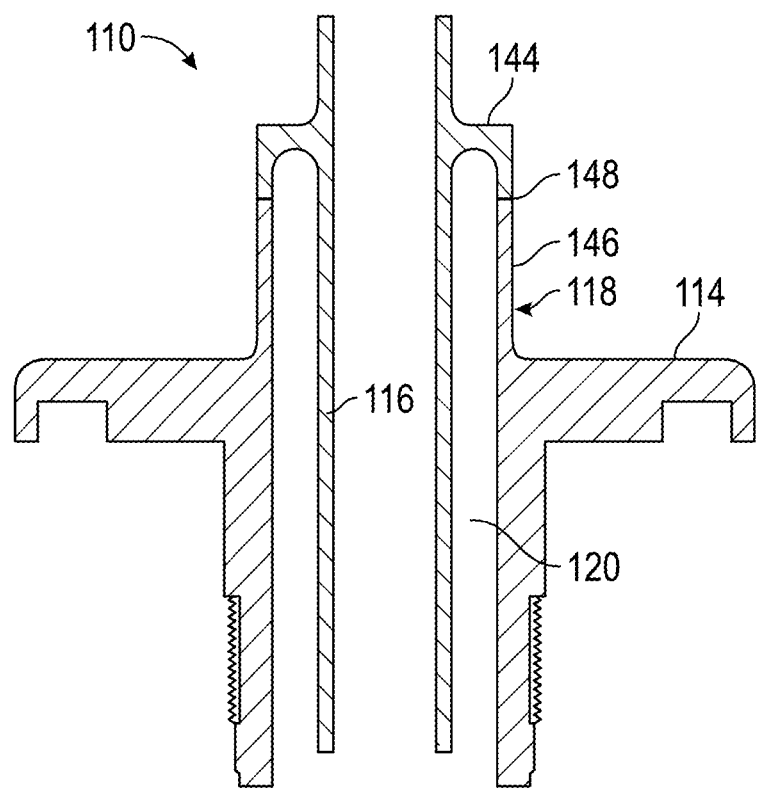
FIG. 5C is a side elevation in section a fitting assembled from the components of FIGS. 5A and 5B.

As shown in FIG. 5C, the mounting flange 114 and tube 116 are joined by a perimeter weld 148 between the perimeter shoulder 144 of the tube 116 and the cylindrical shell 146 of the thermal shell 118. This perimeter weld 148 may join the tube 116 and mounting flange 114 together, thereby forming an all-metal fitting that provides a complete thermal shell 118 and maintains an air pocket 120 (see also FIG. 4A) between the thermal shell 118 and tube 116, with a continuous metal peripheral barrier from tube 116 to bulkhead 108 for leakage prevention and electrical shielding.

While the disclosed bulkhead fitting assemblies 110, 110' have been described in detail, it should be apparent to those having skill in the art that a number of obvious variations may be made without departing from the scope of the disclosure. Any descriptions are used as examples and are not intended to be limiting of the scope of the disclosure. Detailed dimensions are the result of analysis that includes maximum hydraulic temperature and structural temperature limitations, and other performance conditions. Any limitations will appear in the claims as allowed.

What is claimed is:

1. A method of making a bulkhead fitting assembly, the method comprising:
   joining a tube to a mounting flange by a thermal shell, the mounting flange shaped to be mounted on a bulkhead to support the fitting and having a central opening receiving the tube therethrough;
   attaching the thermal shell to the mounting flange to extend axially away from the mounting flange about the tube;
   forming an adapter attached to and extending axially away from the mounting flange, and extending axially away from the thermal shell about the tube;
   spacing the thermal shell, the mounting flange central opening, and the adapter radially outwardly away from the tube to form an air pocket between the tube and the thermal shell, the mounting flange central opening, and the adapter adjacent the mounting flange, and forming a shoulder that connects the tube to the thermal shell on an opposite side of the mounting flange from the adapter; and
   inserting a bushing on the adapter between the adapter and the bulkhead such that the bushing completes a continuous electrical connection from the tube to the adapter, from the adapter to the bushing, and from the bushing to the bulkhead.

2. The method of claim 1, further comprising placing a jamb nut on the adapter, such that the jam nut engages the bushing, such that the bulkhead fitting assembly is locked place by sandwiching the bulkhead between the mounting flange and the jam nut.

3. The method of claim 2, further comprising threading the jamb nut on a threaded portion of the adapter that extends beyond the bulkhead.

4. The method of claim 1, further comprising forming the shoulder to be substantially perpendicular to the tube, and the adapter oriented substantially perpendicular to the mounting flange and parallel to the tube.

5. The method of claim 1, further comprising forming the mounting flange to have a cylindrical shell extending axially away from the central opening.

6. The method of claim 1, further comprising placing an O-ring between the mounting flange and the bulkhead to form a seal therebetween.

7. The method of claim 1, further comprising providing a thin-walled dielectric layer shaped to be positioned between the mounting flange and the bulkhead to electrically isolate the bulkhead from the mounting flange.

8. The method of claim 1, further comprising fabricating the thermal shell from a material selected from a titanium alloy and a corrosion-resistant steel alloy.

9. The method of claim 1, further comprising forming the bulkhead fitting as a continuous metal part.

10. The method of claim 1, further comprising forming the shoulder to extend radially outward from the tube, the shoulder forming a first part of the thermal shell.

11. The method of claim 1, wherein the thermal shell is a cylindrical shell extending axially away from the mounting flange.

12. The method of claim 11, further comprising shaping the adapter to attach the bulkhead fitting assembly to a bulkhead.

13. The method of claim 12, further comprising joining the mounting flange and the tube by a perimeter weld between the shoulder and the thermal shell.

14. The method of claim 1, further comprising providing a thin-walled dielectric layer shaped to be positioned between the mounting flange and the bulkhead; and providing an O-ring seal between the mounting flange and the thin-walled dielectric layer to electrically isolate the bulkhead from the mounting flange.

* * * * *